Figure 1:
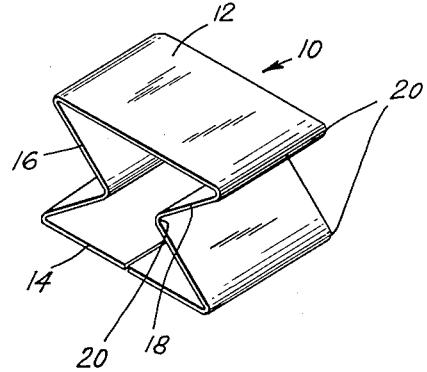

Nov. 20, 1962   G. E. SMITH ET AL   3,065,288
CONSTANT-LOAD VARIABLE-HEIGHT SPRING
Filed May 19, 1960

LOAD-DEFORMATION CURVE OF A SPRING

INVENTORS
GEORGE E. SMITH
DANIEL SHELLEK
BY
ATTORNEY

United States Patent Office 3,065,288
Patented Nov. 20, 1962

3,065,288
CONSTANT-LOAD VARIABLE-HEIGHT SPRING
George E. Smith, Westlake, and Daniel Shellek, Cleveland, Ohio, assignors to Union Carbide Corporation, a corporation of New York
Filed May 19, 1960, Ser. No. 30,193
2 Claims. (Cl. 136—111)

This invention relates to a unique spring, and more particularly, it relates to a spring which is suitable for use in packaging flat type galvanic cells in a battery container.

An inherent property of a galvanic cell made with a magnesium anode is the expansion of the cell as it is being discharged. This expansion is due to the fact that the volume of the reaction products formed during discharge is greater than the volume of the unreacted materials. Accordingly, when a battery of flat cells, utilizing magnesium anodes, is assembled it is essential that provision be made to deal with cell expansion. It has been suggested to build a sufficiently strong container which can withstand the pressure built-up by cell expansion. However, this is expensive due to the material cost of such a container and it also undesirably increases the weight of the battery. It has also been suggested to introduce a resilient material in series with the cells to absorb the expansion. Conventional coil or leaf springs which are commonly present in a battery container to apply pressure to the cell stack to maintain a low resistance electrical contact between adjacent cells, have unfortunately, proved unsuitable for this purpose due to the fact that in such springs, the deflection or change in length of the spring is directly proportional to the force applied. Thus, as such a spring is further compressed, the force exerted by the spring against the container and the cell stack may attain such a magnitude that it will interfere with normal cell operation and possibly cause failure of the battery.

The principal object of the invention is to provide a spring which may be placed in line with a stack of magnesium anode flat cells and which permits the cell stack during discharge of the battery to expand without an increase in the spring load beyond a predetermined maximum value.

A concurrent object of the invention is to provide a spring which may be placed in line with a stack of magnesium anode flat cells and which will prohibit cell destruction due to an increase in internal pressure caused by expansion of the cells during discharge and yet will at all times maintain a compressive force on the individual cells to insure good electrical contact between the adjacent cells.

The objects of the invention are accomplished by utilizing the plastic as well as the resilient properties of the material used to make the spring of the invention. The spring of the invention is shaped to provide six hinge points, the spring being a one piece sheet which defines a resilient closed structure having a top, a bottom and sides and having the overall appearance of a partially collapsed tetrahedron. Once the spring has been loaded enough to cause a permanent set to take place on the hinge points, it will continue to deflect in the direction of the load without any increase in the applied force.

Figure 2:
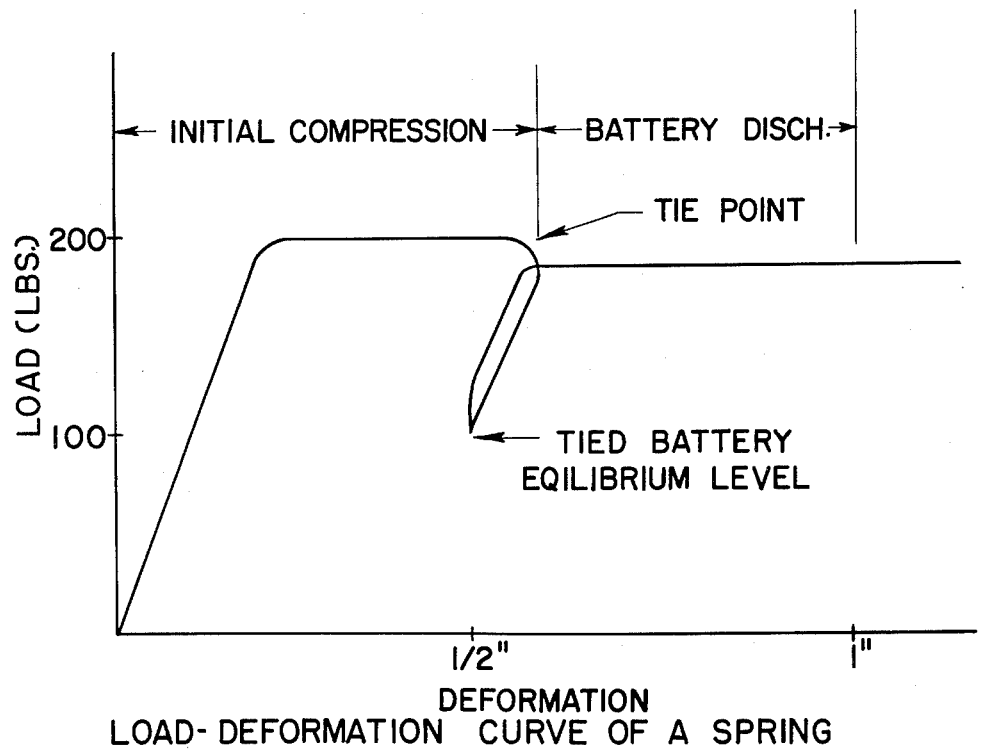

The invention will be more readily understood by reference to the accompanying drawing wherein:

FIG. 1 is a schematic view of a ductile steel spring which embodies the principles of the invention; and FIG. 2 is a stress-strain diagram for the spring of FIG. 1.

Referring now to FIG. 1, the spring of the invention comprises a one piece ductile sheet 10, which defines a resilient closed structure having a top 12, a bottom 14 and sides 16 and 18 which are symmetrically inwardly deflected towards one another, thereby giving the structure the general overall appearance of a partially collapsed tetrahedron. A spring of this configuration is thus provided with six hinge points 20.

As shown in FIG. 2, when a load is applied to the top of the spring of FIG. 1, thereby causing it to deform, the force exerted by the spring will be proportionate to the deformation up to a certain point. At this point, due to the unique shape of the spring, a permanent set will take place at the hinge points and subsequently when the spring is further deformed the force exerted by the spring will remain constant. The load-deformation curve shown in FIG. 2 is the curve for the spring of FIG. 1 which is placed in a battery container and compressed initially to the point where a permanent set takes place, and which is subsequently further deformed due to swelling of the cells upon battery discharge. As shown clearly in the drawing, while the spring continues to deform, the force exerted by the spring remains constant.

In the event that pressure on the spring is released, the spring will tend to recover as a conventional spring. If the loading has exceeded the yield point of the steel, the permanent deformation mentioned above will be introduced so that the spring never returns to its original height. This action is illustrated in FIG. 2, in the loop marked "tied battery equilibrium level." This section of the curve illustrates changes in the spring when it is used in a battery assembly. In practice, the battery is assembled and closed in a machine which applies sufficient force to deform the spring into the plastic range.

After this initial compression, the total stack of cells plus the spring are crimped into the battery jacket. Since the cathode depolarizers of the cells are composed of material with a plastic like composition, they deform or cold flow slightly due to the pressure exerted by the spring. Thus, the pressure is somewhat reduced on the spring and the deformation falls off slightly. When the battery is discharged, the cells firm up and as a result of the discharge reaction expand and exert a pressure once again on the spring, which will deform proportionately once again until the yield point is reached.

A specific example of the spring of the invention is one made from .032 inch thick SAE 1010 No. 1 Temper, 21 gauge steel. Such a spring, 2½ inches wide, 2½ inches long and 1½ inches high before compression, will maintain approximately 170 to 200 pounds of force in the battery container it is designed to fit. In practice, the spring of the invention may be fabricated from any material which is both ductile and resilient when shaped according to the invention. Included in such materials are ductile steel, other ductile metals and even certain ductile plastics.

We claim:
1. The combination of a battery container having therein at least one flat galvanic cell and a spring in line with said flat cell comprising a single sheet of ductile material which defines a resilient closed structure having a top, a bottom and sides which are symmetrically inwardly deflected thereby forming six hinge points, said spring having a general overall appearance of a partially collapsed tetrahedron; and said spring being characterized by the fact that it will exert a force proportionate to the amount of deformation of said spring due to loading until a load sufficient to cause a permanent set to take place on said hinge points is exerted on said spring, said spring then being further characterized by a continued deflection in response to an increased load without any increase in said force exerted by said spring.

2. The combination claimed in claim 1 wherein said ductile material is low carbon steel.

References Cited in the file of this patent

UNITED STATES PATENTS

| | | |
|---|---|---|
| 987,958 | Clenny et al. | Mar. 28, 1911 |
| 2,346,695 | Miller | Apr. 18, 1944 |
| 2,901,526 | Huntley et al. | Aug. 25, 1959 |
| 2,910,580 | McCleary | Oct. 27, 1959 |

FOREIGN PATENTS

| | | |
|---|---|---|
| 375,644 | Great Britain | June 30, 1932 |
| 597,409 | France | Aug. 29, 1925 |